United States Patent [19]

Matsui et al.

[11] Patent Number: 5,751,476
[45] Date of Patent: May 12, 1998

[54] DISPLAY DEVICE

[75] Inventors: Takeshi Matsui, Tokyo; Akira Kawamura, Kanagawa, both of Japan

[73] Assignee: Sony Corporation, Tokyo, Japan

[21] Appl. No.: 603,718

[22] Filed: Feb. 20, 1996

[30] Foreign Application Priority Data

Feb. 28, 1995 [JP] Japan .................................. 7-040565

[51] Int. Cl.⁶ .................................................. G02B 23/00
[52] U.S. Cl. ............................ 359/411; 359/473; 359/630
[58] Field of Search ................................ 359/411, 417, 359/418, 473, 630

[56] References Cited

U.S. PATENT DOCUMENTS

| | | | |
|---|---|---|---|
| 5,124,840 | 6/1992 | Trumbull et al. | 359/472 |
| 5,347,400 | 9/1994 | Hunter | 359/815 |
| 5,446,585 | 8/1995 | Morley et al. | 359/411 |
| 5,535,053 | 7/1996 | Baril et al. | 359/409 |

Primary Examiner—Frank G. Font
Assistant Examiner—Thomas Robbins
Attorney, Agent, or Firm—Hill & Simpson

[57] ABSTRACT

A display device to be worn by the user on his or her head comprising a pair of left and right image display members which are arranged on a frame to be put on a head of a user in a manner enabling them to be moved in a direction toward or away from each other; a pair of left and right lens members on the frame which show virtual images of the images displayed by the image display members to the user, the light axes of which being made substantially parallel to each other at a position on a light path extending from the left image display member to the left eye of the user and at a position on a light path extending from the right image display member to the right eye of the user, in a manner enabling them to be moved in a direction toward or away from each other; and a link mechanism member for variably adjusting the distance in the horizontal direction between the lens members so to adjust the distance in the horizontal direction between the image display members linked with the adjustment of the distance between the lens members.

6 Claims, 7 Drawing Sheets

DISPLAY DEVICE

BACKGROUND OF THE INVENTION

1. Field of the Invention

The present invention relates to a display device for displaying an image, and, more particularly the present invention relates to a display device which can be put on a head of a user.

2. Description of the Related Art

As a conventional binocular head-mounted display device, there is known a display device in which the display images of left and right image display panels supported on a frame worn on the head are viewed and magnified using a pair of left and right lenses supported on the frame.

In this display device, it is possible to change the distance between the lenses and the image display panels so as to adjust the power and to make the image match the eyesight of the user.

In the above-mentioned type of display device, however, when the left and right eyesights of the user are different, adjustment of the power would result in the left and right images appearing to be at different positions. Also, the above-mentioned type of display device has been provided with independent left and right adjustment mechanisms for bringing the positions of the image display panels and lenses into correspondence with the positions of the pupils of the user, therefore it has been difficult to set the left and right image display panels at optimum positions.

Further, in the conventional display device, since the viewed virtual images were positioned differently at the right and left or were fixed in position, the images were viewed in an inadequately adjusted state which therefore induced eye fatigue, a reduction of eyesight, general bodily fatigue, headaches, etc. of the user.

OBJECT AND SUMMARY OF THE INVENTION

The present invention was made in consideration of the above situation. One object of the present invention is to provide a head-mounted display device designed to facilitate adequate adjustment corresponding to the eyesight of the user or the distance between the left and right pupils.

To solve the above problem and achieve the above object, the present invention provides a display device to be worn by the user on his or her head comprising a pair of left and right image display members which are arranged on a frame to be put on a head of a user in a manner enabling them to be moved in a direction toward or away from each other; a pair of left and right lens members on the frame which show virtual images of the images displayed by the image display members to the user, the light axes of which are made substantially parallel to each other at a position on a light path extending from the left image display member to the left eye of the user and at a position on a light path extending from the right image display member to the right eye of the user, in a manner enabling them to be moved in a direction toward or away from each other; and a link mechanism member for variably adjusting the distance in the horizontal direction between the lens members so to adjust the distance in the horizontal direction between the image display members linked with the adjustment of the distance between the lens members.

Accordingly, the display device according to the present invention enables adjustment of the image members and the lens members in the horizontal direction in a mutually linked state.

Also, in the display device in the present invention, the link mechanism member variably adjusts the distance in the horizontal direction between the image display members and the distances to the image display members and the lens members with respect to the distance in the horizontal direction between the lens members, thereby to adjust the angle formed by the light path extending from the left image display member to the left eye of the user and the light path extending from the right image display member to the right eye of the user and adjust the distances from the eyes of the user to the virtual images of the images displayed by the image display members.

Accordingly, the display device according to the present invention enables free adjustment of the distances to the virtual images to be viewed by the user.

Further, in the display device according to the present invention, the link mechanism member includes an elastic member for giving a load to the movement of the lens members and the image display members with respect to the frame.

Accordingly, the display device in the present invention can prevent an unnecessary change in the state of adjustment due to vibration or the like after the adjustment is once completed.

BRIEF DESCRIPTION OF THE DRAWINGS

These and other objects and features of the present invention will become more apparent from the following description of the preferred embodiments made with reference to the drawings, in which.

DETAILED DESCRIPTION OF THE PREFERRED EMBODIMENT

Figure 1:
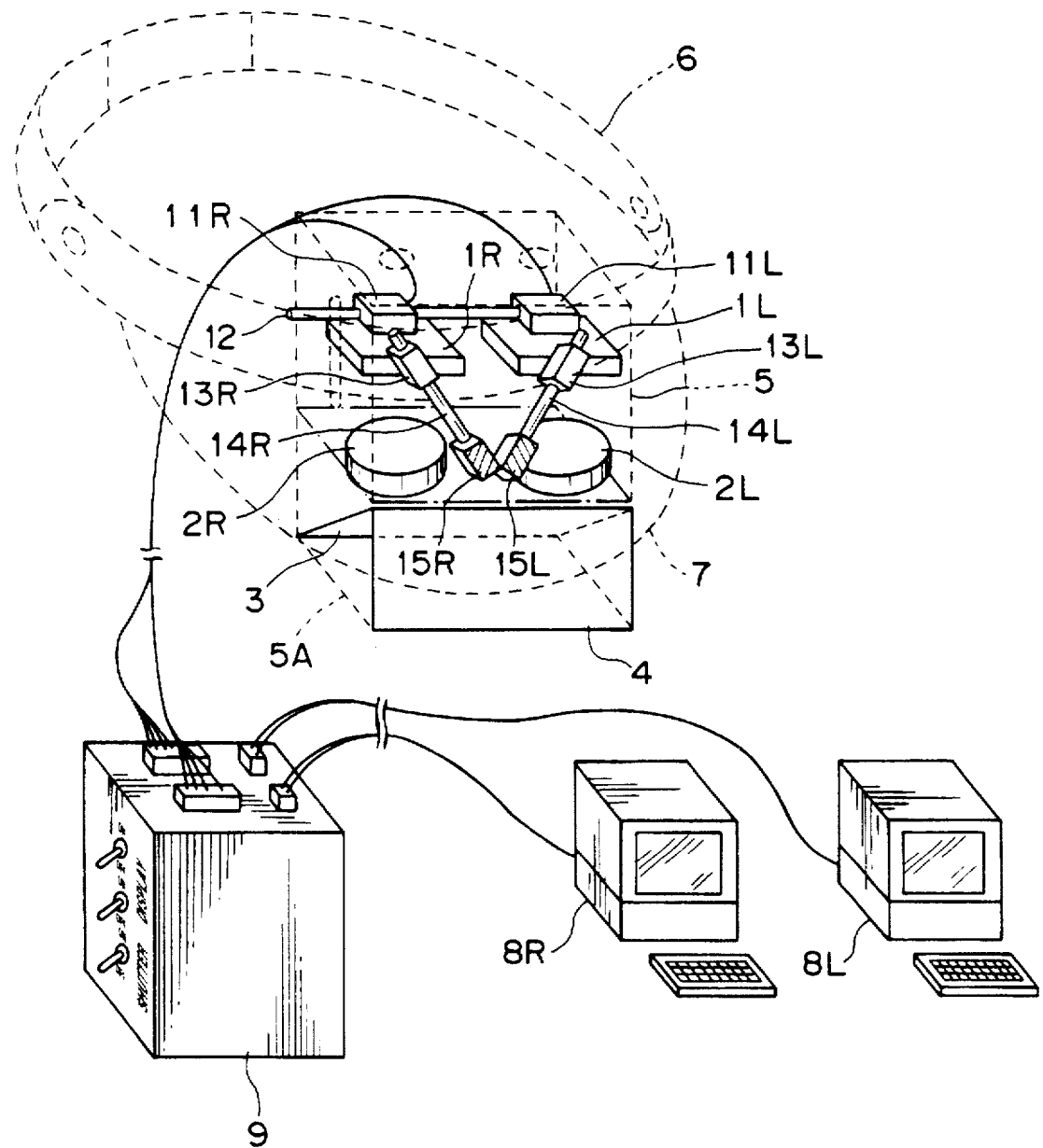
FIG. 1 is a view schematically showing the overall configuration of an eyeglass type display device according to the present invention.

A specific embodiment of the present invention will be explained below.

Before the explanation of the specific embodiment of the present invention, a more detailed explanation will be made of the eyeglass type display device according to the related art by referring to the drawings. The display device according to the related art was proposed in the specification and drawings of U.S. patent application Ser. No. 08/076,953 filed on Jun. 15, 1993 by the present assignee.

FIG. 1 is a view schematically showing the overall configuration of an eyeglass type display device according to the related art. In FIG. 1, left and right lens systems 2L and 2R are provided for the left and right display portions 1L and 1R. Light is reflected at a beam splitter 3 which is inclined by 45° from the light axes of these lens systems 2L and 2R and enters the left and right eyes of the user (not illustrated). In front of the beam splitter 3 is arranged a liquid crystal shutter 4.

The display portions 1L and 1R, lens systems 2L and 2R, beam splitter 3, and liquid crystal shutter 4 are accommodated in any type of housing shown by the broken lines in FIG. 1. This housing 5 is formed by a material which is painted inside by a delustering black and which does not allow light to pass through it. In FIG. 1, the housing 5 is attached to a housing attachment portion 7 of the head attachment member 6 shown by the broken lines.

By attaching this head attachment member 6 to the head, it becomes possible to view virtual images.

Note that the left and right image signals supplied to the left and right display portions 1L and 1R are respectively prepared by the computers 8L and 8R. These image signals are supplied to the display portions 1L and 1R through a control device 9. The control device 9 generates a control signal for opening or closing the liquid crystal shutter 4 in accordance with the operation of a switch.

In this eyeglass type display device, the left and right display portions 1L and 1R are affixed to first linear sliders 11L and 11R, respectively. These linear sliders 11L and 11R are attached to a common first slider shaft 12. Together with this, the left and right display portions 1L and 1R are affixed to second linear sliders 13L and 13R, respectively. These second linear sliders 13L and 13R are attached to second and third slider shafts 14L and 14R, respectively. These slider shafts 14L and 14R are affixed to the housing 5 at a predetermined angle by for example an adhesive with the use of the affixing members 15L and 15R.

By moving the first slider shaft 12 in the upward direction or downward direction, the left and right display portions 1L and 1R are made to move toward or away from the left and right lens systems 2L and 2R. Accordingly, the power may be adjusted. Further, the display portions 1L and 1R may be made to move away from or toward the left and right lens systems 2L and 2R while changing in position along the second and third slider shafts 14L and 14R by moving the first slider shaft 12 in the upward direction or downward direction.

Figure 2:
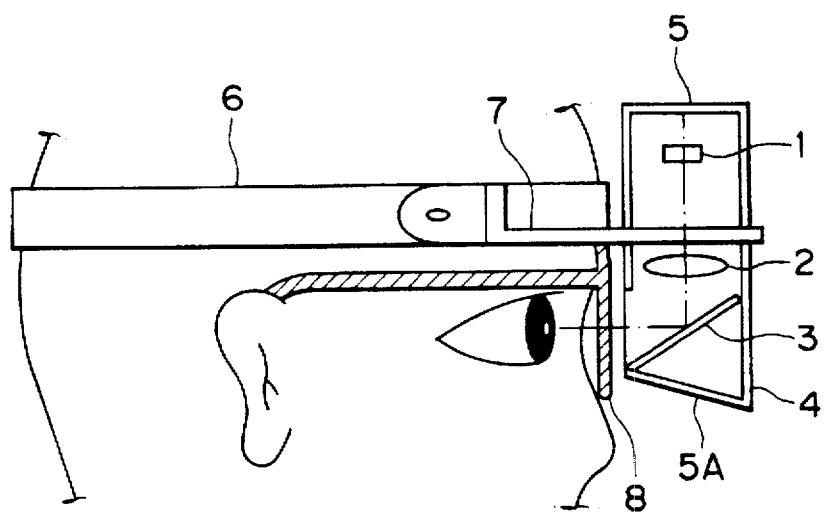
FIG. 2 is a view showing the state of wearing the eyeglass type display device of FIG. 1.

FIG. 2 is a view showing the state wherein the eyeglass type display device of FIG. 1 is worn.

As shown, this eyeglass type display device has the left and right display portions 1L and 1R and the left and right lens systems 2L and 2R arranged at the front of the head attachment member 6. The left and right display portions 1L and 1R and the left and right lens systems 2L and 2R are arranged above the left and right eyes of the viewer. Since the light is bent by the beam splitter 3 which is inclined by 45° with respect to the light axes of the left and right lens systems 2L and 2R and, at the same time, the liquid crystal shutter 4 is arranged in front of the beam splitter 3, even in a state where the eyeglass type display device is worn, the outside can be viewed instantaneously by just opening the liquid crystal shutter. Moreover, it also becomes possible to view an image while observing work in the outside.

In this eyeglass type display device, as shown in FIG. 2, a housing attachment portion 7 is formed on the head attachment member 6, and the beam splitter 3 is arranged positioned away from the face of the viewer by a predetermined distance below the housing attachment portion 7. Due to this, a downward field of vision can be secured while even when the eyeglass type display device is being worn and, at the same time, a regular pair of eyeglasses 8 can be freely attached or taken off without requiring removal of the eyeglass type display each time.

In this eyeglass type display device, further, the area under the beam splitter 3 is covered by a bottom surface 5A continuing from the housing 5. Due to this, the incidence of outside light from beneath the beam splitter 3 is prevented. Also unnecessary reflection at the left and right display portions 1L and 1R is prevented, and therefore the viewability of the virtual image can be greatly improved.

A specific embodiment of the display device according to the present invention will be explained next by referring to the drawings.

The present invention improves on the display portions, lens systems, and peripheral portions of the above eyeglass type display device.

Figure 3:
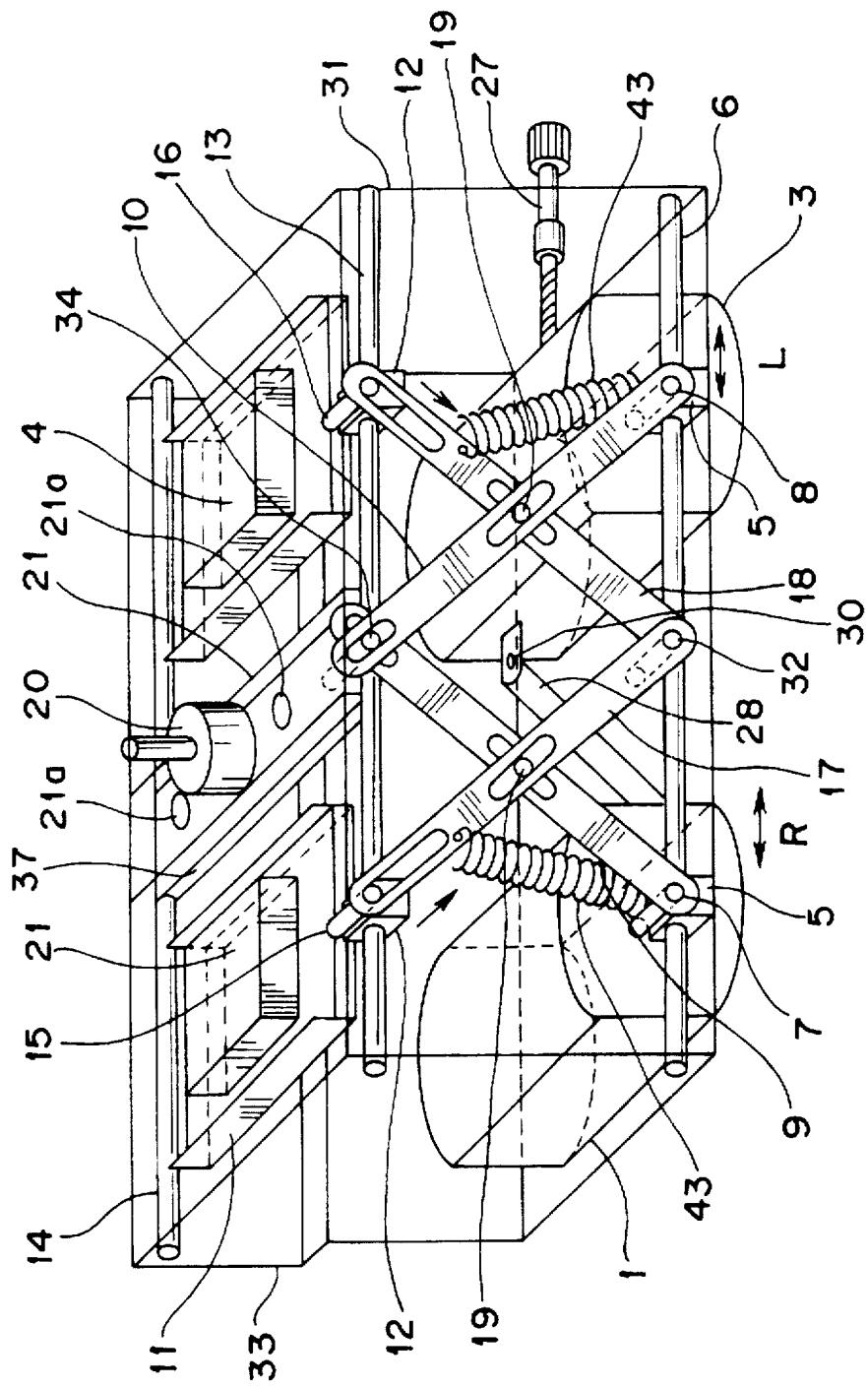
FIG. 3 is a perspective view showing the configuration of a display device according to the present invention.
Figure 4:
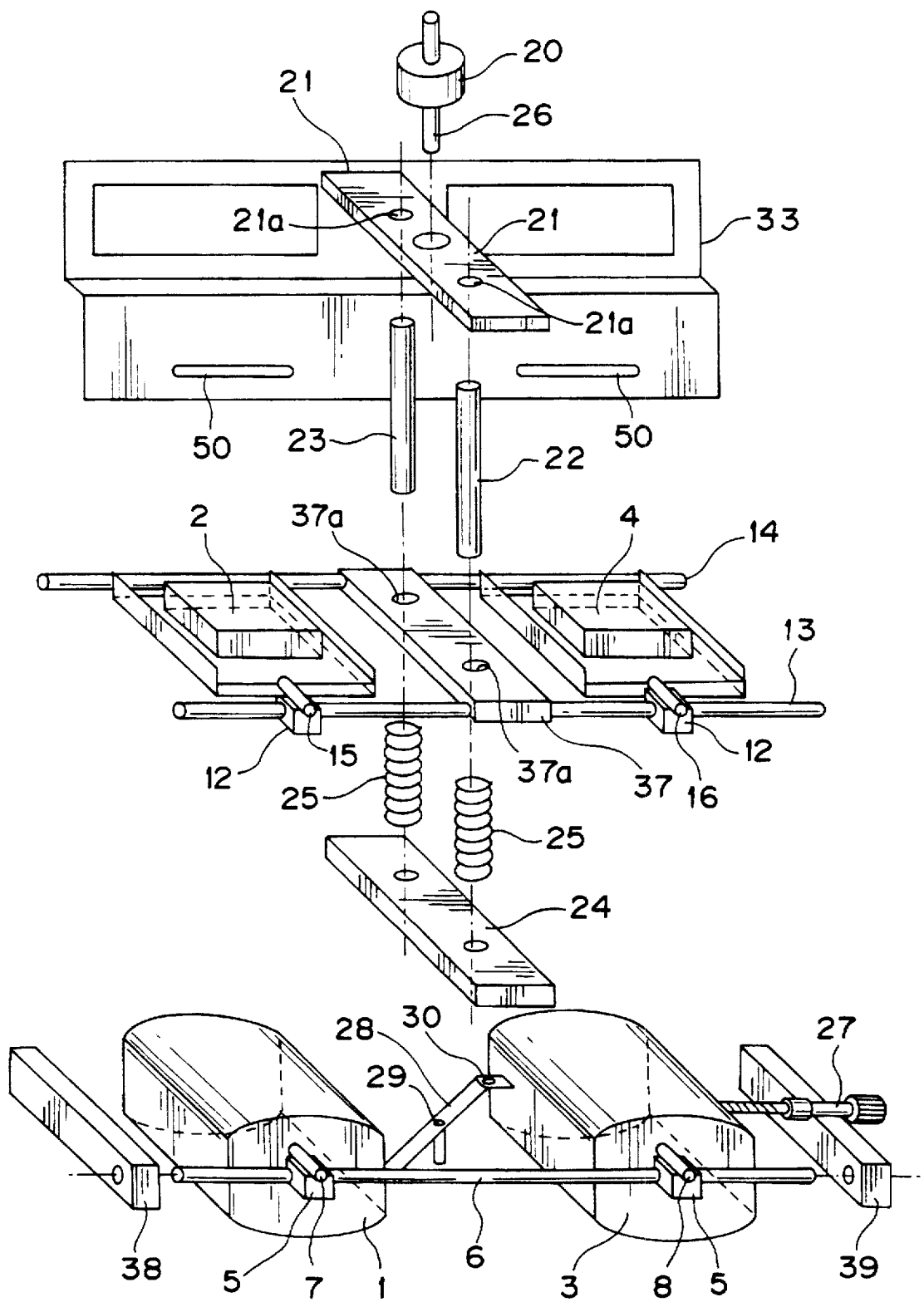
FIG. 4 is a perspective view showing the disassembled principal parts of the display device according to the present invention.

FIG. 3 shows the configuration of the display device according to the present invention; and FIG. 4 is a perspective view showing the disassembled principal parts of the display device.

The display device according to the present invention is constituted by, as shown in FIG. 3, frame portions 31 and 32 of a frame worn affixed to the head of the user and a pair of left and right image display panels 2 and 4 and a pair of left and right lens portions 1 and 3 arranged on these frame portions 31 and 32 and serving as the image display portions.

As the image display panels 2 and 4, use may be made of liquid crystal displays (LCD).

Figure 5:
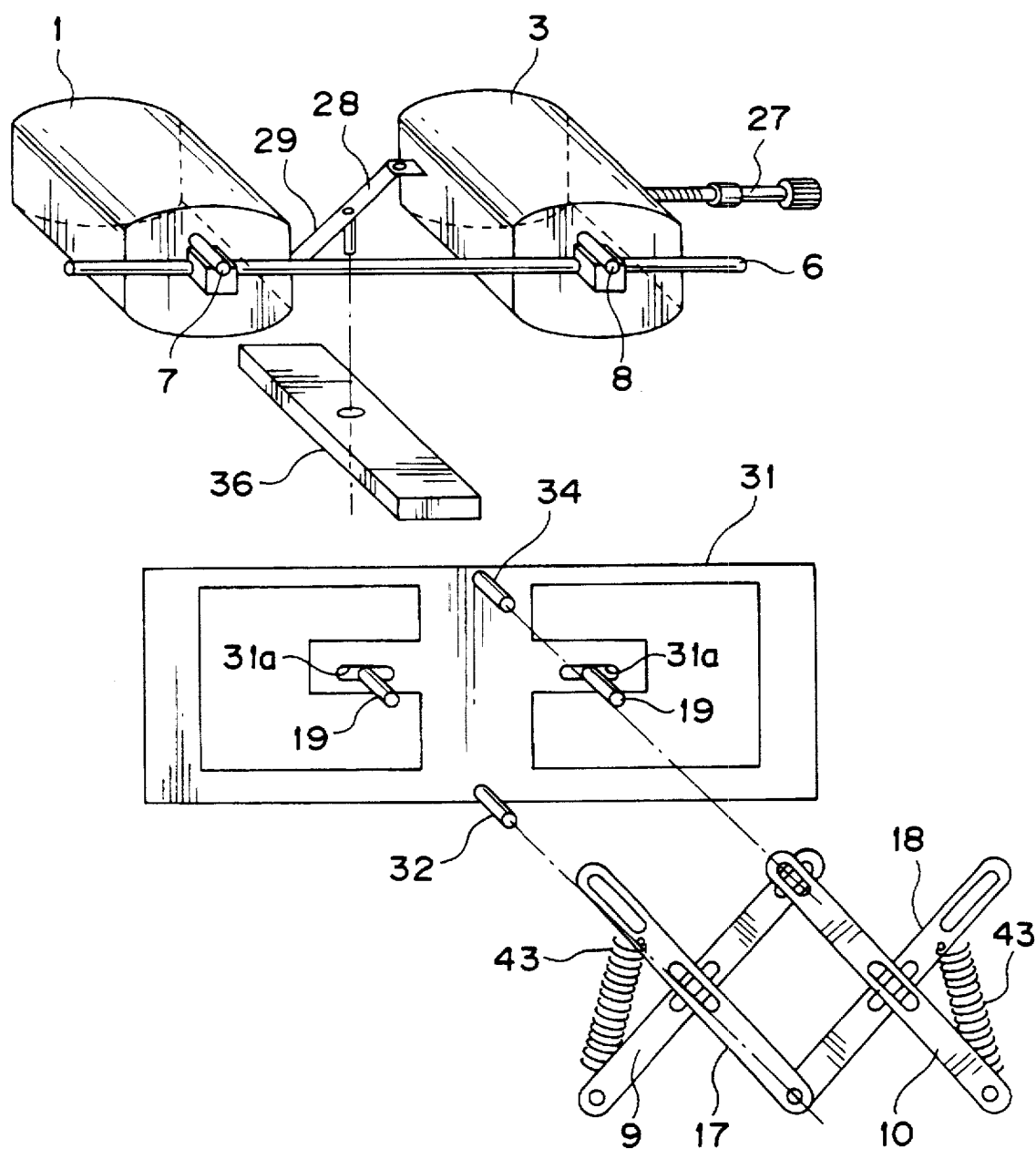
FIG. 5 is a perspective view showing the disassembled parts of a link mechanism of the display device according to the present invention.

FIG. 5 is a perspective view showing the disassembled parts of a link mechanism of the display device according to the present invention.

The frame has the front frame portion 31 and a rear frame portion 33 and comprised by a substantially box shape. The bottom part of this frame is constituted by a lower side frame guide 36 fixed with respect to the lower ends of the front frame portion 31 and the rear frame portion 33.

This frame contains a right side lens portion 1 and a left side lens portion 3 substantially parallel to each other.

Figure 6:
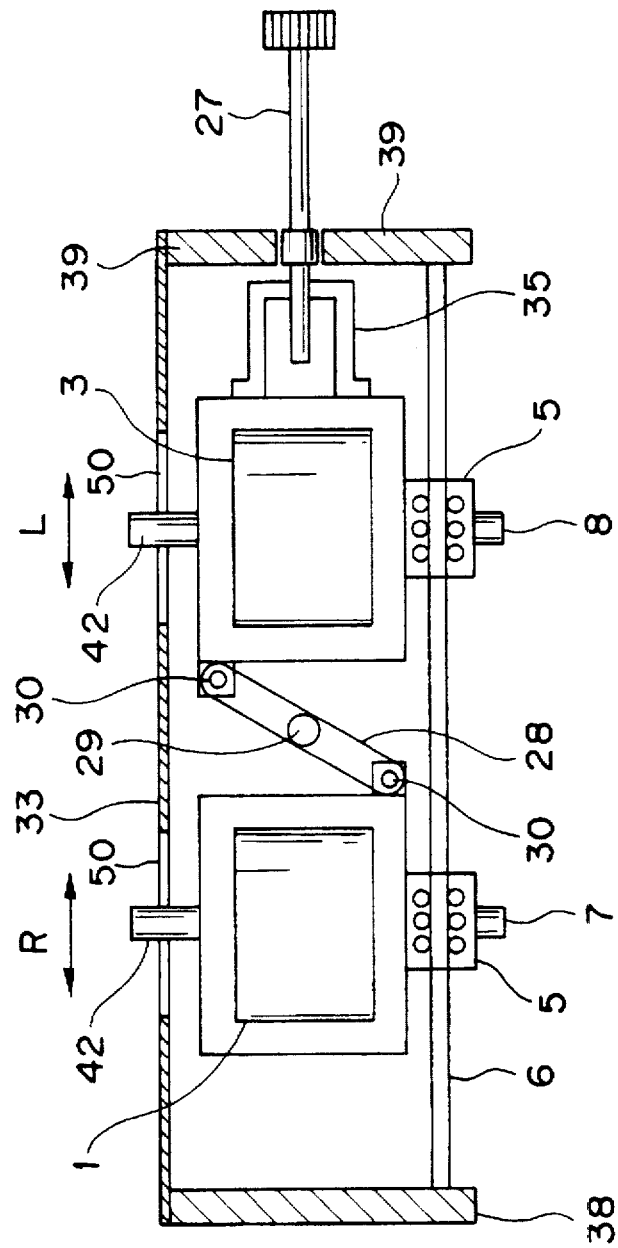
FIG. 6 is a plan view of a partial cross-section of the configuration for supporting the lens portions of the display device according to the present invention.

FIG. 6 is a plan view showing a partial cross-section of the configuration for supporting the lens portions of the display device.

In the lens portions 1 and 3, as shown in FIG. 6, lens bearings 5 and 5 are attached to the fronts. These lens bearings 5 and 5 are movable in the horizontal direction along a lens shaft 6 attached to the front frame portion 31.

The two ends of the lens shaft 6 are affixed by a right side lens guide 38 and a left side lens guide 39 arranged at the left and right sides of the lower part of the frame.

Also, at the rear of the lens portions 1 and 3, rear side lens pins 42 and 42 are provided. The rear side lens pins 42 and 42 are designed so that they can move to the left or the right as indicated by the arrow R and the arrow L in FIG. 6 along grooves 50 and 50 provided in the rear frame portion 33 in the lateral direction.

A pupil distance adjustment screw 27 is provided extending between the left side lens portion 3 and the left side lens guide 39. This pupil distance adjustment screw 27 may be turned to variably adjust the distance between the left side lens portion 3 and the left side lens guide 39.

Between the left side lens portion 3 and the right side lens portion 1, a lens link 28 is provided. The center portion of this lens link 28, as shown in FIG. 6, is pivotally supported by a center pin 29 affixed to the lower side frame guide 36, the right end is pivotally connected to the front side of the right side lens portion 1 via a link pin 30, and the left end is pivotally connected to the rear side of the left side lens portion 3 via a link pin 30.

Namely, this lens link 28 is designed to cause the lens portions 1 and 3 to be positioned symmetrically with respect to the frame.

The left and right lens bearings 5 and 5 have a right side lens pin 7 and a left side lens pin 8 attached facing the front, respectively. These right side lens pin 7 and left side lens pin 8 are respectively rotatably fitted in holes of the lower ends of a right side inverse V-link 9 and a left side inverse V-link 10 arranged at the front of the front frame portion 31 and constituting parts of the link mechanism.

The right side inverse V-link 9 and the left side inverse V-link 10 are linear links and form inverse V's by having their upper ends superimposed on each other and their lower ends positioned spaced apart in the horizontal direction.

The upper ends of the right side inverse V-link 9 and the left side inverse V-link 10 are formed with upper end groove portions along the longitudinal direction of the links. These upper end groove portions are superimposed on each other and enable insertion of an upper side V-link pin 34 projecting frontward from the upper portion of the center part of the front frame portion 31.

Figure 7:
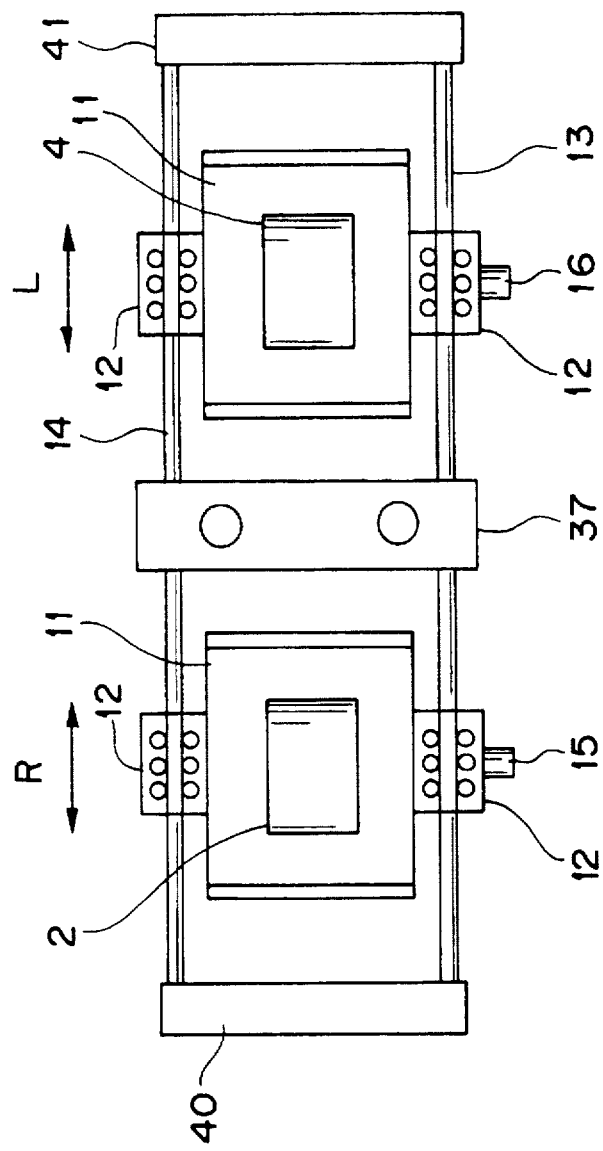
FIG. 7 is a plan view showing the configuration for supporting the image display portions of the display device according to the present invention.

FIG. 7 is a plan view showing the configuration for supporting the image display portions of the display device.

The right side image display panel 2 and the left side image display panel 4 are attached to the panel attachment plates 11 and 11, respectively, as shown in FIG. 7. At the front and rear of these panel attachment plates 11 and 11 are attached panel bearings 12 and 12, respectively. These panel bearings 12 and 12 can move in the horizontal direction along a front panel shaft 13 positioned at the upper portion of the front frame portion 31 and a rear panel shaft 14 positioned at the upper portion of the rear frame portion 33.

These panel shafts 13 and 14 are respectively affixed by a right side panel guide 40 and a left side panel guide 41 arranged so as to be positioned at the two sides of the upper portion of the frame and constitute a frame-like member together with these right side panel guide 40 and left side panel guide 41. The panel shafts 13 and 14 and the panel guides 40 and 41 can move integrally in the vertical direction with respect to the frame.

The panel attachment portions 11 and 11 have attached at their front portions a right side panel pin 15 and a left side panel guide pin 16, respectively. These right side panel pin 15 and left side panel guide pin 16 are inserted into the groove portions of the upper ends of the left side V-link 18 and the right side V-link 17 which are arranged at the front of the front frame portion 31 and constitute the link mechanism. These groove portions are formed along the longitudinal direction of the left side V-link 17 and the right side V-link 18.

The left side V-link 18 and the right side V-link 17 are linear links and form a V-shape by having their lower ends superimposed on each other and their upper ends positioned spaced apart in the horizontal direction. The center portions of these left side V-link 18 and the right side V-link 17 are superimposed on the left side inverse V-link 10 and the right side inverse V-link 9, respectively.

The lower ends of these right side V-link 17 and left side V-link 18 are formed with lower hole portions. These lower side hole portions are superimposed on each other and allow insertion of the lower V-link pin 32 projecting toward the front from the lower portion of the center part of the front frame portion 31.

The V-links 17 and 18 and the inverse V-links 9 and 10 have center groove portions along the longitudinal direction of these links in the center parts. These center groove portions are superimposed on each other at two positions at the left and right. Through these center groove portions, a pair of left and right link center pins 19 and 19 are inserted, respectively. These link center pins 19 and 19 project toward the front in the left and right parts of the front frame portion 31, respectively and, at the same time, can move in the horizontal direction along a pair of left and right groove portions 31a and 31a formed in this front frame portion 31, respectively.

The display device has a driving motor 20 for moving the panel shafts 13 and 14 in the vertical direction.

This driving motor 20, as shown in FIG. 4, is arranged affixed on a motor attachment plate 21 arranged so as to extend from the upper end of the center portion of the front frame portion 31 to the upper end of the center portion of the rear frame portion 33.

When the driving motor 20 is actuated, it makes the motor shaft 26 project downward. The panel plate 37 arranged so as to extend between the center parts of the panel shafts 13 and 14 in the front and rear direction is pressed downward by this motor shaft 26.

The motor attachment plate 21 is formed with a pair of front and rear supporting holes 21a and 21a. The upper ends of a front vertical shaft 22 and a rear vertical shaft 23 are inserted through these supporting holes 21a and 21a and affixed to them, respectively.

The panel plate 37 has a pair of front and rear shaft insertion holes 37a and 37a. These shaft insertion holes 37a and 37a have the front vertical shaft 22 and the rear vertical shaft 23 inserted through them, respectively. Namely, the panel plate 37 can move in the vertical direction together with the panel shafts 13 and 14 along the vertical shafts 22 and 23.

The lower ends of the front vertical shaft 22 and the rear vertical shaft 23 are supported by the shaft guide 24 arranged affixed so as to extend between the front frame portion 31 and the rear frame portion 33.

Between the shaft guide 24 and the panel plate 37 are interposed a pair of front and rear shaft springs 25 and 25. These shaft springs 25 and 25 push the above panel plate 37 upward.

Accordingly, by the driving of the driving motor 20, the panel plate 37 can be moved in the vertical direction via the motor shaft 26.

Next, an explanation will be made of the operation of the different portions of the display device according to the present invention.

In this display device, first, the pupil distance adjustment screw 27 is turned to adjust the distance between the lens portions 1 and 3 to the distance between the pupils of the user. Namely, when the pupil distance adjustment screw 27 is turned, the left side lens portion 3 moves horizontally and, via the lens link 28, the right side lens portion 1 is moved in a reverse direction to the direction of movement of the left side lens portion 3.

At this time, the lens pins 7 and 8 move horizontally following the movement of the lens portions 1 and 3 and move the lower ends of the right side inverse V-link 9 and the left side inverse V-link 10 in the horizontal direction. The inverse V-links 9 and 10 move while the upper ends are restrained by the upper V-link pin 34, therefore the link center pins 19 and 19 are moved in parallel to the lens shaft 6 along the groove portions 31a and 31a of the front frame portion 31.

The link center pins 19 and 19 are moved horizontally, whereby the V-links 17 and 18 are pivoted around the lower V-link pin 32.

The V-links 17 and 18 pivoted around the lower V-link pin 32 by the movement of the V-link center pins 19 and 19 horizontally move the panel pins 15 and 16 fitted in the groove portions of the upper ends.

By the movement of these panel pins 15 and 16 to the left or right, the right side image display panel 2 and the left side image display panel 4 are moved in synchronization with the movement of the lens portions 1 and 3, that is, while the positional relationship between the right side lens portion 1 and the right side image display panel 2 and the positional relationship between the left side lens portion 3 and the left side image display panel 4 are held symmetrically as they are.

By the above movement, the adjustment of the distance between the lens portions 1 and 3 in accordance with the distance between the pupils of the user can be carried out.

When the panel plate 37 is vertically moved by the operation of the driving motor 20, the panel pins 15 and 16 will move along the groove portions of the upper ends of the V-links 17 and 18. Namely, at this time, the image display panels 2 and 4 will be moved along the longitudinal direction of the stopped V-links 17 and 18.

By this movement, the adjustment of the position (distance from the user) of the virtual image to be viewed can be carried out.

A load is applied to the V-links 17 and 18 by the driving motor 20. Here, these V-links 17 and 18 and the lens pins 7 and 8 (or the lens shaft 6) are connected by using a pair of left and right link load springs (tensile coil springs) 43 and 43 acting as elastic members. When the upper ends of these V-links 17 and 18 are stretched downward, positional deviation of the V-links 17 and 18 and the image display panels 2 and 4 moving along these V-links 17 and 18 at the time of operation of the driving motor 20 can be prevented.

Note that the display device according to the present invention is not restricted to the above embodiment. It is also possible if the panel plate 37 is moved in the vertical direction without the use of the driving motor 20 by a manually operated adjustment screw.

Also, in this display device, it is also possible if the lens portions 1 and 3 are moved by the driving force of the driving motor.

Further, in this display device, as the image display portions, use can be made of various flat image display panels other than liquid crystal display panels.

Also, in this display device, as the elastic member, it is also possible to use a plate spring or a rubber belt in addition to the coil spring as mentioned above.

As mentioned above, the display device of the present invention comprises a pair of left and right image display members which are arranged on a frame to be put on a head of a user in a manner enabling them to be moved in a direction toward or away from each other; a pair of left and right lens members on the frame which show virtual images of the images displayed by the image display members to the user, the light axes of which being made substantially parallel to each other at a position on a light path extending from the left image display member to the left eye of the use and at a position on a light path extending from the right image display member to the right eye of the user, in a manner enabling them to be moved in a direction toward or away from each other; and a link mechanism member for linking with the adjustment of the distance between the lens members so to variably adjust the distance in the horizontal direction between the lens members so as to adjust the distance in the horizontal direction between the image display members.

Accordingly, the display device according to the present invention enables adjustment of the image members and the lens members in the horizontal direction in a mutually linked state.

Namely, this display device can adjust the image display portions and the lens portions to the distance between pupils of different individuals by moving them in association by using the link mechanism member.

Also, in the display device in the present invention, the link mechanism member variably adjusts the distance in the horizontal direction between the image display members and the distances to the image display members and the lens members with respect to the distance in the horizontal direction between the lens members, thereby to adjust the angle formed by the light path extending from the left image display member to the left eye of the user and the light path extending from the right image display member to the right eye of the user and adjust the distances from the eyes of the user to the virtual images of the images displayed by the image display members.

Accordingly, the display device according to the present invention enables free adjustment of the distances to the virtual images to be viewed by the user.

Namely, the display device according to the present invention has a member which enables continuous adjustment of the position with respect to the virtual images by adjusting the image display portions and the lens portions to the distance between pupils of different individuals, so can provide images adjusted to the eyesight of the user and can reduce the fatigue of the user.

Further, in the display device in the present invention, the link mechanism member includes an elastic member for giving a load to the movement of the lens members and the image display members with respect to the frame.

Accordingly, the display device in the present invention can prevent an unnecessary change of the state of adjustment due to vibration or the like after the adjustment is once completed.

Namely, the display device in the present invention is provided with a member eliminating the positional deviation, and therefore can realize an optimum optical position in comparison with the conventional case and can reduce the distortion of the provided image etc.

In this way, the present invention can provide a head mounted type display device designed to facilitate adequate adjustment corresponding to the eyesight of the user and the distance between the left and right pupils.

Note that various modifications and applications are conceivable within a range not exceeding the gist of the present invention. Accordingly, the present invention is not restricted to the embodiments.

What is claimed is:

1. A method of adjusting a display device comprising the steps of:

adjusting a horizontal distance between first and second lens members; and simultaneously adjusting a horizontal distance between first and second image display members in synchronization with the adjustment of the distance between first and second lens members.

2. The method of claim 1, further comprising the step of adjusting a vertical position of at least one image display member.

3. A display device comprising:
(a) left and right image display members arranged on a frame to be put on a head of a user;
said left and right image display members being movably mounted for movement in a direction toward or away from each other;
(b) left and right lens members arranged on the frame, the left and right lens members being movably mounted for movement in a direction toward or away from each other; and
(c) a link member, connected between the lens members and the image display members linking adjustment of the distance in the horizontal direction between the image display members with adjustment of the distance between the lens members.

4. A display device as set forth in claim 3, wherein said link mechanism member includes an elastic member for giving a load to the movement of the lens members and the image display members with respect to the frame.

5. A display device as set forth in claim 3, wherein said link member variably adjusts the distance in the horizontal direction between the image display members and the distances to the image display members and the lens members with respect to the distance in the horizontal direction between the lens members, thereby to adjust an angle formed by the light path extending from the left image display member to the left eye of the user and the light path extending from the right image display member to the right eye of the user and the distances from the eyes of the user to virtual images displayed by the image display members.

6. A display device as set forth in claim 5, wherein said link mechanism member includes an elastic member giving a load to the lens members and the image display members with respect to the frame.

* * * * *